United States Patent [19]
Numoto et al.

[11] Patent Number: 5,273,692
[45] Date of Patent: Dec. 28, 1993

[54] METHOD FOR PRODUCING A HONEYCOMB SHAPED CERAMIC

[75] Inventors: Hironao Numoto, Ikoma; Atsushi Nishino; Yukiyoshi Ono, both of Osaka, all of Japan

[73] Assignee: Matsushita Electric Industrial Co., Ltd., Osaka, Japan

[21] Appl. No.: 711,223

[22] Filed: Jun. 6, 1991

[51] Int. Cl.$^5$ ............................................. C04B 41/00
[52] U.S. Cl. ........................................ 264/26; 264/25; 264/63; 264/177.11; 264/177.12; 264/343; 264/344
[58] Field of Search ............... 264/63, 177.11, 177.12, 264/344, 343, 25, 26

[56] References Cited

U.S. PATENT DOCUMENTS

| | | | |
|---|---|---|---|
| 3,953,562 | 4/1976 | Hait | 264/343 |
| 4,162,285 | 7/1979 | Tanabashi | 264/66 |
| 4,996,015 | 2/1991 | Yoshimoto | 264/63 |
| 5,043,117 | 8/1991 | Adachi | 264/344 |

*Primary Examiner*—James Derrington
*Attorney, Agent, or Firm*—Panitch Schwarze Jacobs & Nadel

[57] ABSTRACT

A method for producing a honeycomb shaped ceramic having a predetermined shape made of a flat honeycomb molding formed from a composition containing a heat-resistant inorganic material is disclosed. This method comprises the steps of: forming a honeycomb molding from a composition containing heat-resistant inorganic materials, a binder which is gelled when coming in contact with hot water, and a plasticizer; providing the honeycomb molding with flexibility by immersing the honeycomb molding in hot water at a temperature high enough to gel the binder; and sintering the honeycomb molding.

8 Claims, 9 Drawing Sheets

METHOD FOR PRODUCING A HONEYCOMB SHAPED CERAMIC

BACKGROUND OF THE INVENTION

1. Field of the Invention

The present invention relates to a method for producing a honeycomb shaped ceramic having a desired shape such as a curved cross section or a corrugated cross section. A honeycomb shaped ceramic obtained by the present invention is useful as a substrate carrying a catalyst, a filter, or a general construction material.

2. Description of the Prior Art

As a substrate carrying a catalyst, a ceramic having a flat honeycomb structure formed by extrusion molding has been used. The honeycomb shaped ceramic has a large geometric surface area because of its plurality of through holes provided from the upper to the lower surfaces thereof. Accordingly, this ceramic is useful as a substrate carrying a catalyst.

Conventionally, such a ceramic has been produced as follows: First, a heat-resistant inorganic material, an appropriate amount of molding auxiliary and water are mixed together, and the composition obtained is extruded to form a flat honeycomb molding. Then, the honeycomb molding is thoroughly dried, after which it is heated to a proper temperature, sintering the heat resistant inorganic material, and a flat honeycomb ceramic is obtained.

In the conventional method for producing a honeycomb shaped ceramic, a honeycomb shaped ceramic having a curved or corrugated shapes cannot be obtained. Therefore, the application of the honeycomb shaped ceramic and the construction of an apparatus using the honeycomb shaped ceramic have been limited.

In the above-described method, the composition is extruded to form a honeycomb molding, after which this molding is dried with air. The air-drying may introduce an additional problem of deforming the honeycomb molding. To eliminate this problem, an attempt has been made that an inorganic material with an excellent slipping property is used in the composition and the amount of water to be used is reduced. However, a honeycomb molding prepared from such a composition is also deformed at the time of air-drying, or the occurrence of cracks is found in the inside of the honeycomb molding.

SUMMARY OF THE INVENTION

The method for producing a honeycomb shaped ceramic having a predetermined shape, which overcomes the above-discussed and numerous other disadvantages and deficiencies of the prior art, comprises the steps of forming a honeycomb molding from a composition containing heat-resistant inorganic materials, a binder which is gelled when coming in contact with hot water at an appropriate temperature, and a plasticizer; providing the honeycomb molding with flexibility by the immersion thereof in hot water at a temperature high enough to gel the binder; and sintering the honeycomb molding.

In a preferred embodiment, the hot water contains a surfactant.

In a preferred embodiment, the hot water contains an additive such as tannic acid for maintaining the shape of the honeycomb molding.

In a preferred embodiment, the binder is selected from the group consisting of methyl cellulose, hydroxypropyl cellulose, and hydroxypropylmethyl cellulose.

In a preferred embodiment, the plasticizer is selected from the group consisting of sorbitan acid ester and polyolefin glycol ether.

In a preferred embodiment, the honeycomb shaped ceramic is formed from a composition of 80 to by weight of $SiO_2$, 5 to 18% by weight of $Al_2O_3$, 2 to 6% by weight of $TiO_2$, and 0.4 to 1.5% by weight of $K_2O$.

A method for producing a honeycomb shaped ceramic of the present invention comprises the steps of:

forming a flat honeycomb molding from a composition containing a heat-resistant inorganic material, a binder which is gelled when coming in contact with hot water, and a plasticizer;

providing the honeycomb molding with flexibility by immersing the honeycomb molding in hot water at a temperature high enough to gel the binder;

placing the honeycomb molding on a heat-resistant jig having a predetermined shape; and sintering the honeycomb molding on the jig to be formed into a shape of an outside surface thereof.

In a preferred embodiment, another heat-resistant jig is placed on the honeycomb molding on the jig before sintering the honeycomb molding.

In a preferred embodiment, the step of placing the honeycomb molding on a heat-resistant jig having a predetermined shape is performed by transferring the honeycomb molding on the sheet onto the jig.

In a preferred embodiment, the jig has water absorptivity.

In a preferred embodiment, the jig has a curved cross section.

A method for producing a honeycomb shaped ceramic of the present invention comprises the steps of:

preliminarily sintering the flat honeycomb molding formed from a composition containing, as a heat-resistant inorganic material, rehydratable alumina, fused silica, and potassium titanate at a temperature in the range of 1,050° to 1,150° C.; and placing the sintered honeycomb molding on a jig having a predetermined shape, followed by sintering at a temperature in the range of 1,150° to 1,300° C.

In a preferred embodiment, the step of sintering the honeycomb molding is performed with the heat-resistant jig placed thereon.

A method for producing a honeycomb shaped ceramic of the present invention comprises the steps of:

forming a honeycomb molding from a composition containing a heat-resistant inorganic material which contains rehydratable alumina, fused silica, and potassium titanate, a binder which is gelled when coming in contact with hot water, and a plasticizer;

providing the honeycomb molding with flexibility by immersing the honeycomb molding in hot water at a temperature high enough to gel the binder;

placing the honeycomb molding on a first heat-resistant jig having a predetermined shape;

preliminarily sintering the honeycomb molding at a temperature in the range of 1,050° to 1,150° C.;

moving the honeycomb molding from the first jig to a second heat-resistant jig having a smaller radius of curvature than that of the first jig; and sintering the honeycomb molding at a temperature in the range of 1,200° to 1,300° C. while a heat-resistant presser jig is placed on the honeycomb jig to apply a load thereto.

In a preferred embodiment, the first and second jigs and presser jig have water absorptivity.

Thus, the invention described herein makes possible the objectives of (1) providing a method for producing a honeycomb shaped ceramic having a desired shape such as a curved cross section, a corrugated cross section, and a ring-shaped cross section; (2) providing a method for producing a honeycomb shaped ceramic which can be used for an apparatus whose construction is not limited; (3) providing a method for producing a honeycomb shaped ceramic which is useful as a substrate for carrying a catalyst, a filter, or a general construction material; and (4) providing a method for producing a honeycomb shaped ceramic having the above-mentioned properties and good productivity.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
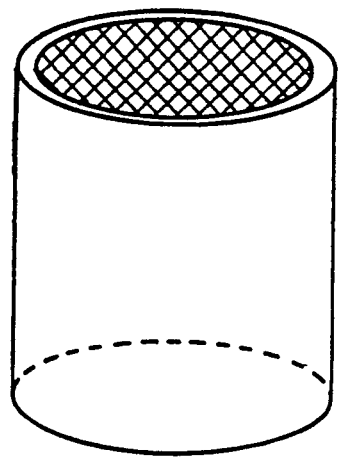
FIG. 1 is a perspective view showing a honeycomb shaped ceramic obtained by the production method of one example of the present invention.

In the present invention, a honeycomb molding is formed from a composition containing heat-resistant inorganic materials, a binder which is gelled when coming in contact with hot water at an appropriate temperature, and a plasticizer.

Examples of the heat-resistant inorganic materials used in the present invention include fused silica, rehydratable alumina, titania, zirconia, kaolin, talc, mullite, corgierite, titanate of alkali-or alkaline-metal such as potassium titanate, silicon carbide, silicon nitride, and clay. The preferred composition of these heat-resistant inorganic materials comprises 5 to 30% by weight of rehydratable alumina, 1 to 10% by weight, more preferably 2 to 7% by weight of potassium titanate, and 68 to 93% by weight of fused silica.

The above-mentioned "rehydratable alumina" refers to transition alumina such as $\rho$-alumina and amorphous alumina excluding $\alpha$-alumina, obtained by thermally decomposing an alumina hydrate. This kind of alumina can be produced on an industrial scale by bringing an alumina hydrate such as an alumina-3-hydrate obtained by the Bayer's process into contact with hot gas at around 400° to 1,200° C. for a couple of minutes or by maintaining an alumina hydrate at around 50° to 900° C. for one minute to four hours under reduced pressure. The rehydratable alumina usually has about 0.5 to 15% by weight of ignition loss.

Examples of the above-mentioned potassium titanate include 4-potassium titanate and 6-potassium titanate. Especially, potassium titanate having a fibrous structure (the aspect ratio is 10 or more) is preferably used to obtain a ceramic with excellent properties such as thermal shock resistance and mechanical strength, since the pore volume thereof can be made large.

It is preferred that the above-mentioned fused silica has a low coefficient of thermal expansion of $0.5\times10^{-6}/°$ C. In general, when silica is contaminated with foreign matter during its fusing and grinding steps, the coefficient of thermal expansion of fused silica increases, thereby providing a honeycomb shaped ceramic with poor thermal shock resistance. Physical properties of fused silica also vary depending on the cooling speed from the fused state during the production thereof. For example, fused silica obtained by cooling at a low speed is readily crystallized as a cristobalite when the ceramic containing that silica is used at high temperatures, so that the honeycomb shaped ceramic has poor thermal shock resistance. Therefore, fused silica which has little possibility of contaminating foreign matters and which has a low coefficient of thermal expansion is preferably selected.

When the added amount of rehydratable alumina is less than 5% by weight, the mechanical strength of the honeycomb shaped ceramic obtained becomes unsatisfactory. On the other hand, when the added amount of rehydratable alumina is more than 30% by weight, the coefficient of thermal contraction of the honeycomb shaped ceramic obtained becomes high.

When the added amount of potassium titanate is less than 1% by weight, the mechanical strength of a ceramic molding obtained becomes unsatisfactory. On the other hand, when more than 10% by weight of potassium titanate is added, a honeycomb molding is not readily extruded since potassium titanate is a fiber with a high aspect ratio.

It is preferred that the honeycomb shaped ceramic obtained includes 5 to 18% by weight of $Al_2O_3$, 80 to 90% by weight of $SiO_2$, 2 to 6% by weight of $TiO_2$, and 0.4 to 1.5% by weight of $K_2O$. A honeycomb shaped ceramic with those components has a low coefficient of thermal expansion and high mechanical strength, so that it can resist severe conditions. In particular, a honeycomb shaped ceramic with these components is preferably obtained by using rehydratable alumina, fused silica, and 6-potassium titanate and is excellent in its properties.

A binder used in the present invention is usually water-soluble at a temperature of about 30° C. or less, and is gelled when it comes in contact with hot water at an appropriate temperature. Examples of a binder include a cellulose ether type binder such as methyl cellulose, hydroxypropylmethyl cellulose, and hydroxypropyl cellulose. When those binders are used, a honeycomb molding can readily be extruded. Moreover, the honeycomb molding can be gelled at a wide range of temperatures from about 60° to 90° C., and water can be conveniently used as a medium for gelling. For example, METOLOSE 60 SH-4000 (produced by Shinetsu Kagaku Kogyo) is used as a binder, which is hydrated at low temperatures and is rapidly gelled when it comes in contact with hot water at a temperature of 60° C. or more. Accordingly, a honeycomb molding containing METOLOSE 60 SH-4000 as a binder maintains a sufficient mechanical strength in hot water without losing its shape. The mechanical strength depends on the added amount of binder and the temperature of the hot water in which a honeycomb molding is immersed.

A plasticizer used in the present invention provides a honeycomb molding with flexibility, when the honeycomb molding is immersed in hot water at a temperature high enough to gel the binder. Examples of a plasticizer include sorbitan acid ester and polyolefin glycol ether. When a honeycomb molding which does not include the plasticizer is immersed in hot water at a temperature high enough to gel the binder, the honeycomb molding has excellent mechanical strength. However, when the honeycomb molding containing no plasticizer is transformed into a predetermined shape after the immersion, cracks occur therein. In contrast, when an excessive amount of plasticizer is contained, the flexibility of the honeycomb molding in hot water becomes too large, so that the handling of the honeycomb molding during the steps after immersion becomes difficult. As described above, the above-mentioned sorbitan acid ester has greater effects on flexibility of the honeycomb molding compared with polyolefin glycol ether.

The binder and the plasticizer used in the present invention are related with each other. The contents and kinds of the binder and the plasticizer can be determined in accordance with an intended shape of the honeycomb shaped ceramic.

To produce a honeycomb shaped ceramic of the present invention by using the above composition, the above-mentioned inorganic materials, binder, and plasticizer are mixed together. This composition, if required, may contain a colorant, fats and oils, and water. A flat honeycomb molding is formed from the composition by the conventional extrusion method. The honeycomb molding has a number of through holes provided from the upper to the lower surfaces thereof. Then, the honeycomb molding obtained is immersed in hot water at a temperature high enough to gel the binder, so that the honeycomb molding maintains its shape and becomes easy to transform. In this step, it takes a long time to gel the binder contained in the honeycomb molding with a small numerical aperture of large size, often resulting in wrapping of the grid and deformation of the honeycomb molding. When a surfactant is added to the hot water, wettability and permeability of the honeycomb molding with water is improved, and the honeycomb molding absorbs water just after being immersed in hot water. This accelerates the gelling of the binder, and the honeycomb molding can be kept from being deformed. Moreover, a honeycomb shaped ceramic with excellent dimensional accuracy can be obtained. The temperature of the hot water for the gelling is preferably in the range of about 60° to 90° C.

When hot water contains an additive for maintaining the shape of the honeycomb molding, the deformation thereof can effectively be prevented. The reason for this is as follows:

After being withdrawn from hot water, the honeycomb molding is cooled by ambient air, and a gelled binder contained therein is redissolved. Accordingly, the honeycomb molding which is not uniformly and promptly dried has inferior mechanical strength compared to the honeycomb molding just after being withdrawn from hot water, the honeycomb molding whose shape is maintained with dimensional accuracy in hot water is likely to be deformed during the successive production steps thereof. When a tannin agent is added to hot water as an additive, the binder contained in the honeycomb molding becomes insoluble in hot water. Because of this, even though the honeycomb molding is cooled before drying, it does not lose satisfactory mechanical strength thereof. Moreover, the honeycomb molding can be prevented from being deformed using only a simple hot air drying method during the drying step.

Next, the honeycomb molding having flexibility is placed on a heat-resistant jig with a predetermined shape, followed by being dried. The shape of the jig is varied in accordance with a shape of the intended ceramic. For example, to obtain a ceramic molding bent in a U-shape, a jig bent in a U-shape is used, and to obtain a corrugated ceramic molding, a corrugated jig is used. A jig having water absorptivity is preferably used. The reason for this is as follows:

When the honeycomb molding placed on a jig made of alumina with no water absorptivity is dried, water from the honeycomb molding is accumulated between the honeycomb molding and the jig. The water is evaporated. The evaporated water pushes up the honeycomb molding. As a result, the honeycomb molding does not have the same shape as that of the surface of the jig, and it is difficult to obtain a honeycomb shaped ceramic having the intended dimension and shape. In contrast, when the honeycomb molding placed on a jig having water absorptivity is dried, most of the water from the honeycomb molding is absorbed by the jig, thereby eliminating the above problem.

When a honeycomb molding is thick, it is difficult to transform the honeycomb molding into a predetermined shape just by placing it on a jig. Therefore, it is necessary to place another jig for pressing on top of the honeycomb molding. This presser jig can be formed into the same shape as that of the jig placed under the honeycomb molding, or the presser jig can be in a different shape. It is preferred that the presser jig has properties such as heat resistance and water absorptivity.

To obtain a thin ceramic molding in a predetermined shape, it is required that a flat honeycomb molding is made thin. After immersion in hot water, the thin honeycomb molding is likely to be deformed because of its flexibility. Therefore, care should be taken so that the honeycomb molding is not damaged while being moved to a heat-resistant jig. In order to solve this problem, the honeycomb molding having flexibility is placed on a sheet, and then the honeycomb molding is moved to a jig together with the sheet. The sheet used herein can be made of paper with water absorptivity or a mesh-shaped plastic with flexibility. By using this kind of sheet, even an unstable honeycomb molding can readily be moved to a jig. When a sheet having water absorptivity and high density is used, the honeycomb molding is likely to separate from the jig due to the deformation of the sheet while being dried. Therefore, the density of the sheet is preferably 40 g/m² or less.

The honeycomb molding can be dried by hot air, or dielectric heating. In particular, when the dielectric heating is performed, there are some advantages as follows:

(1) Drying time can be shortened because of the high heating efficiency.

(2) Even a honeycomb molding in a complicated shape can relatively uniformly dried.

(3) Energy can be controlled without delay, since heating is performed by electric wave.

(4) The furnace wall is not heated, since the temperature of the honeycomb molding alone is increased.

As described above, when the honeycomb molding is heated by dielectric heating, the honeycomb molding in a complicated shape can be uniformly dried for a short period of time with satisfactory productivity.

After being dried, the honeycomb molding is sintered on the jig to be transformed into the shape of the outside surface of the jig. The temperature for sintering is preferably in the range of 1,150° to 1,300° C. so that the above-mentioned inorganic material will be fused. For example, when rehydratable alumina, fused silica, and potassium titanate are used as an inorganic material, alumina and potassium titanate enter their solid phases at the grain boundary of fused silica at the temperature of 1,150° C. or more, whereby a honeycomb shaped ceramic having excellent mechanical strength and low thermal expansion properties can be obtained. In contrast, when the honeycomb molding is sintered at a temperature more than 1,300° C., fused silica is eroded by the above solid phases, and one part of the solid phases is crystallized as a cristobalite, resulting in a honeycomb shaped ceramic with degraded heat shock resistance.

When the honeycomb molding is sintered, it is readily transformed into the shape of the outside surface of the jig by the load of its own weight. For example, when a jig having a U-shaped cross section is used, a ceramic molding having a U-shaped cross section can be obtained. When a jig having a corrugated cross section is used, the ceramic molding having a corrugated cross section can be obtained.

Another method for producing a honeycomb shaped ceramic having a predetermined shape will be described.

First, a composition containing inorganic materials of rehydratable alumina, fused silica, and potassium titanate is extruded to form a flat honeycomb molding. Then, the honeycomb molding is provisionally sintered at a temperature in the range of 1,050° to 1,150° C. (first sintering). During this sintering, a binder and plasticizer contained in the honeycomb molding is burned to be removed. When the honeycomb molding is sintered at a temperature in the range of 300° to 1,000° C., the sinter obtained is very unstable, and is likely to be damaged or cracks occur therein while being moved to a jig. Therefore, the honeycomb molding is sintered at a temperature of 1,050° C. or more. From that temperature, the sinter is provided with mechanical strength to some degree, so that cracks do not occur therein when the sinter is moved to a jig with an intended shape. Next, the first-sintered honeycomb molding is further sintered at a temperature in the range of 1,150° to 1,300° C. (second sintering). The honeycomb molding is gradually transformed by the load of its own weight. The honeycomb molding so obtained has a shape of the outside surface of the jig.

When a honeycomb shaped ceramic having a small radius of curvature is produced, the presser jig is placed on the honeycomb molding during the sintering and the honeycomb molding is further transformed. The resulting honeycomb shaped ceramic has the desired small radius of curvature.

In order to obtain a ceramic molding which is further transformed, the following method can be used. First, as described above, a honeycomb molding is formed from a composition containing inorganic materials including rehydratable alumina, fused silica and potassium titanate; a binder which can be gelled when contacted with hot water; and a plasticizer. Then, the honeycomb molding is provided with flexibility by being immersed in hot water at a temperature high enough to gel the binder. The honeycomb molding is placed on a first jig, after which the honeycomb molding is provisionally sintered at a temperature in the range of 1,050° to 1,150° C. Then, the honeycomb molding is moved to another heat resistant jig having a smaller radius of curvature than that of the first jig. A heat resistant presser jig is placed on the honeycomb molding, and the honeycomb molding is sintered at a temperature in the range of 1,200° to 1,300° C. with a load of the presser jig applied thereon. Materials and conditions used in this method are as described above. According to this method, a honeycomb shaped ceramic having a small radius of curvature, a curved cross section, a corrugated cross section, and a ring-shaped cross section can be obtained.

EXAMPLES

Hereinafter, the present invention will be described by way of illustrating examples.

EXAMPLE 1

Figure 2:
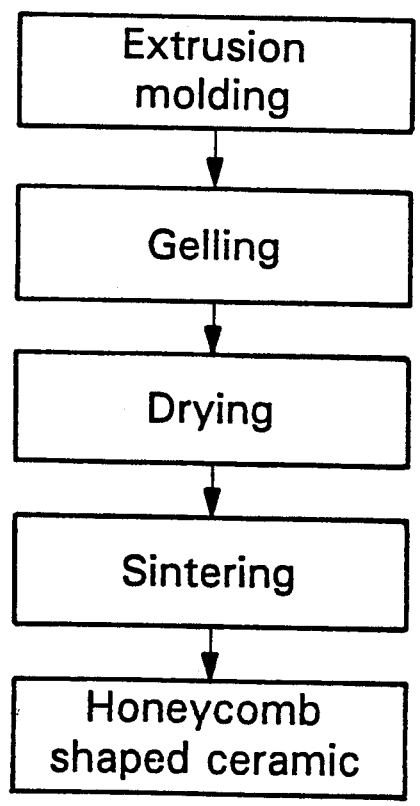
FIG. 2 is a flowchart showing the procedure to obtain the honeycomb shaped ceramic of FIG. 1.

First, 10 parts by weight of rehydratable alumina, 85 parts by weight of fused silica, 5 parts by weight of potassium titanate, and as a binder, 7 parts by weight of METOLOSE 60 SH-4000 (produced by Shinetsu Kagaku Kogyo) were mixed. An appropriate amount of water was then added, and the mixture was kneaded. The resulting composition was extruded to obtain a honeycomb molding with a diameter of 105 mm, a length of 153 mm, and a cell density of 300 cell/in² (a cell pitch of 1.47 mm and a rib thickness of 0.20 mm) as shown in FIG. 1. Then, the honeycomb molding was immersed in hot water at 90° C. containing 0.1% by weight of anionic surfactant (sodium dioctyl sulfosuccinate) for one minute to gel the binder (METOLOSE 60 SH-4000) according to the scheme shown in FIG. 2. The time required for gelling the binder was determined by observing the disappearance of bubbles from the honeycomb molding in the hot water.

Next, the honeycomb molding was withdrawn from the hot water and subjected to blown hot air at about 150° C. at 0.5 kg/cm², thereby removing excess water which remained in the lattice of the honeycomb molding. Then, the honeycomb molding was heat-treated at 120° C. for 2 hours to be dried. After being thoroughly dried, the honeycomb molding was gradually heated to a temperature of 1,200° C. and was left at that temperature for one hour, obtaining a sintered honeycomb shaped ceramic.

The honeycomb shaped ceramic so obtained did not lose its initial shape and had excellent dimensional accuracy.

COMPARATIVE EXAMPLE 1

A sintered honeycomb shaped ceramic was obtained in the same way as in Example 1 except that the extruded honeycomb molding was not immersed in hot water. The honeycomb shaped ceramic so obtained was considerably deformed due to the load of its own weight through the drying step. More specifically, the diameter of the lower part thereof was larger than that of the upper part. Moreover, the honeycomb lattice of the lower part was slightly twisted.

EXAMPLE 2

The honeycomb molding obtained in the same way as in Example 1 was immersed in hot water at 90° C. containing 0.1% by weight of anionic surfactant (sodium dioctyl sulfosuccinate) for one minute to gel the binder (METOLOSE 60 SH-4000). After that, the honeycomb molding was withdrawn from the hot water, and was subjected to blown hot air at about 150° C. at 0.5 kg/cm$^2$, thereby removing excess water which remained in the lattice of the honeycomb molding. Then, the honeycomb molding was dried using a dielectric heating unit having an output of 1.5 kw and 2,450 MHz for 8 minutes. After being thoroughly dried, the honeycomb molding was gradually heated to a temperature of 1,200° C. and was left at that temperature for one hour, obtaining a honeycomb shaped ceramic.

The honeycomb shaped ceramic so obtained kept its initial shape and had excellent dimensional accuracy. Moreover, in this example, since a dielectric heating unit was used for drying, the time required for drying could be substantially shortened compared with that of Example 1.

EXAMPLE 3

A honeycomb molding obtained in the same way as in Example 1 was immersed in hot water at 90° C. containing 0.1% by weight of anionic surfactant (sodium dioctyl sulfosuccinate) for one minute to gel the binder (METOLOSE 60 SH-4000). After that, the honeycomb molding was withdrawn from the hot water and subjected to blown hot air at about 150° C. at 0.5 kg/cm$^2$, thereby removing excess water which remained in the lattice of the honeycomb molding. Then, the honeycomb molding was dried using a dielectric heating unit having an output of 1.5 kw and 2,450 MHz for 5 minutes with hot air at about 120° C. blown from the through holes thereof. After being thoroughly dried, the honeycomb molding was gradually heated to a temperature of 1,200° C. and was left at that temperature for one hour, obtaining a honeycomb shaped ceramic.

The honeycomb shaped ceramic so obtained kept its initial shape and had excellent dimensional accuracy. Moreover, in this example, since both dielectric heating and hot air were used for drying, the time required for drying could be further shortened compared with that of Example 2.

In the above-mentioned examples, an anionic surfactant (sodium dioctyl sulfosuccinate) was used as a surfactant. When the anionic surfactant was replaced by cationic or nonionic surfactant, the same surfactant effects were obtained. Among them, the anionic surfactant had great effects even in a small amount, and 0.1 to 2.0% by weight of the anionic surfactant in hot water was preferred.

In Example 1, it was preferred that 5 to 10 parts by weight of binder was contained in the raw ceramic composition. The reason for this is as follows:

When the raw ceramic composition contains less than 5 parts by weight of binder, enough mechanical strength cannot be obtained even after being immersed in the hot water. When the raw ceramic composition contains more than 10 parts by weight of binder, greater effects cannot be expected and production cost is increased.

The temperature of the hot water in which the honeycomb molding was immersed was preferably higher by at least 10° C. than that for gelling the binder.

EXAMPLE 4

First, 10 parts by weight of rehydratable alumina, 85 parts by weight of fused silica, 5 parts by weight of potassium titanate, and as a binder, 7 parts by weight of METOLOSE 60 SH-4000 (produced by Shinetsu Kagaku Kogyo) were mixed. An appropriate amount of water and fats and oils were then added and the mixture was kneaded. The resulting composition was extruded to obtain a honeycomb molding with a diameter of 105 mm, a length of 100 mm, and a cell density of 300 cell-/in$^2$ (a cell pitch of 1.47 mm and a rib thickness of 0.20 mm). Then, the honeycomb molding was immersed in hot water at 90° C. containing 5% by weight of tannic acid for 6 minutes to gel and insolubilize the binder (METOLOSE 60 SH-4000) according to the scheme shown in FIG. 2. About 3 minutes after the disappearance of bubbles from the molding in the hot water, the molding in which the binder was assumed to be gelled and insolubilized was withdrawn from the hot water.

Next, air was blown into the honeycomb molding by an air gun (0.5 kg/cm$^2$), thereby removing excess water which remained in the lattice of the honeycomb molding. The honeycomb molding was then heat-treated at 110° C. for 2 hours to be dried. After being thoroughly dried, the honeycomb molding was gradually heated to a temperature of 1,200° C. and was left at that temperature for one hour, obtaining a sintered honeycomb shaped ceramic.

The honeycomb shaped ceramic so obtained kept its initial shape and had excellent dimensional accuracy.

COMPARATIVE EXAMPLE 2

A honeycomb shaped ceramic was obtained in the same way as in Example 4 except that the extruded honeycomb molding was not immersed in the hot water.

As a result, the honeycomb shaped ceramic so obtained was considerably deformed due to the load of its own weight through the drying step, and cracks occurred therein. More specifically, the diameter of the lower part thereof was larger than that of the upper part. Moreover, the honeycomb lattice of the lower part was slightly twisted.

EXAMPLE 5

A honeycomb molding obtained in the same way as in Example 4 was immersed in hot water at 90° C. for 3 minutes to gel the binder.

Next, the honeycomb molding was withdrawn from the hot water and subjected to blown hot air at about 150° C. at 0.5 kg/cm$^2$, thereby removing excess water which remained in the lattice of the honeycomb molding. Then, the honeycomb molding was dried by a dielectric heating unit with an output of 1.5 kw and 2,450

MHz for 6 minutes. After that, the honeycomb molding was gradually heated to a temperature of 1,200° C. and was left at that temperature for one hour, obtaining a honeycomb shaped ceramic.

The honeycomb shaped ceramic so obtained kept its initial shape and had excellent dimensional accuracy.

EXAMPLE 6

A honeycomb molding obtained in the same way as in Example 4 was immersed in hot water at 90° C. containing 5% by weight of tannic acid and 0.1% by weight of anionic surfactant (sodium dioctyl sulfosuccinate) for 3 minutes to gel and insolubilize the binder. The time required for gelling and insolubilizing the binder was about 2 minutes after the disappearance of bubbles from the honeycomb molding in the hot water.

Next, the honeycomb molding was withdrawn from the hot water, and air was blown into the honeycomb molding by an air gun (0.5 kg/cm$^2$), thereby removing excess water which remained in the lattice of the honeycomb molding. Then, the honeycomb molding was dried by heat-treating at 110° C. for 2 hours. After being thoroughly dried, the honeycomb molding was gradually heated to a temperature of 1,200° C. and was left at that temperature for one hour, obtaining a honeycomb shaped ceramic.

The honeycomb shaped ceramic so obtained kept its initial shape and had excellent dimensional accuracy. Moreover, in this example, a surfactant and tannic acid were contained in the hot water, so that the time required for gelling and insolubilization of the binder was considerably shortened compared with Example 4.

EXAMPLE 7

A honeycomb molding (with a length of 200 mm) obtained in the same way as in Example 4 was immersed in hot water at 90° C. containing 5% by weight of tannic acid for 9 minutes to gel and insolubilize the binder. The time required for gelling and insolubilizing the binder was about 3 minutes after the disappearance of bubbles from the honeycomb molding in the hot water Next, the honeycomb molding was withdrawn from the hot water and air was blown into the honeycomb molding by an air gun (0.5 kg/cm$^2$), thereby removing excess water which remained in the lattice of the honeycomb molding. Then, the honeycomb molding was dried by heat-treating at 120° C. for 2 hours.

A lattice in the center of the upper portion of the honeycomb shaped ceramic so obtained was twisted. The reason for this is as follows:

The honeycomb molding in this example has a high cell density and a long length, so that it takes a long time to gel the binder. Therefore, the hot water is not readily immersed into the upper center portion of the honeycomb molding.

EXAMPLE 8

A honeycomb molding (with a length of 200 mm) obtained in the same way as in Example 4 was immersed in hot water at 90° C. containing 5% by weight of tannic acid and 0.1% by weight of anionic surfactant (sodium dioctyl sulfosuccinate) for 4 minutes to gel and insolubilize the binder. The time required for gelling and insolubilizing the binder was about 2 minutes after the disappearance of bubbles from the honeycomb molding in the hot water.

Next, the honeycomb molding was withdrawn from the hot water, and air was blown into the honeycomb molding by an air gun (0.5 kg/cm$^2$), thereby removing excess water which remained in the lattice of the honeycomb molding. Then, the honeycomb molding was dried by heat-treating at 120° C. for 2 hours. After being thoroughly dried, the honeycomb molding was gradually heated to a temperature of 1,200° C. and was left at that temperature for one hour, thereby obtaining a honeycomb shaped ceramic.

The honeycomb shaped ceramic so obtained kept its initial shape and had excellent dimensional accuracy. In this example, the surfactant contained in hot water exhibited great effects compared with Example 7.

EXAMPLE 9

First, 10 parts by weight of rehydratable alumina, 85 parts by weight of fused silica, 5 parts by weight of 6-potassium titanate, and as a binder, 6.5 parts by weight of METOLOSE 60 SH-4000 (produced by Shinetsu Kagaku Kogyo) were mixed, after which as a plasticizer, 1.5 parts by weight of sorbitan acid ester and water were added, followed by kneading. The resulting composition was extruded and dried by dielectric heating, thereby obtaining a honeycomb molding having widths of 150 mm×70 mm, a length of 150 mm, and a cell density of 60 cell/in$^2$ (a cell pitch of 3.3 mm and a rib thickness of 0.40 mm). Then, the honeycomb molding was cut into pieces with a thickness of 1.0, 2.0, 3.0, 4.0, 5.0, 6.0, 7.0, 8.0, 9.0, and 10.0 mm, respectively. After that, in accordance with the following production methods A, B, and C, curved honeycomb shaped ceramics were obtained.

Method A

Figure 3A:
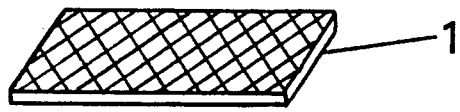
FIG. 3 shows a series of steps of method A for producing a honeycomb shaped ceramic of one example of the present invention.
Figure 3B:
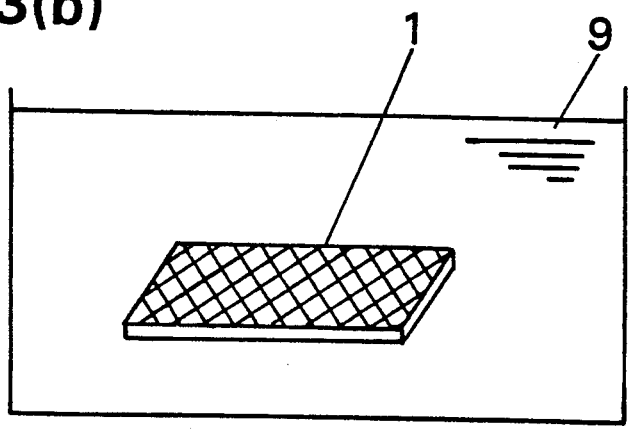
Figure 3C:
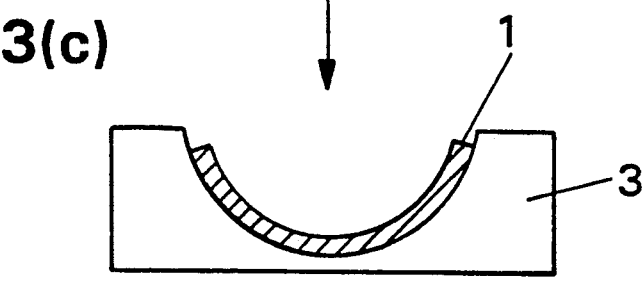
Figure 3D:
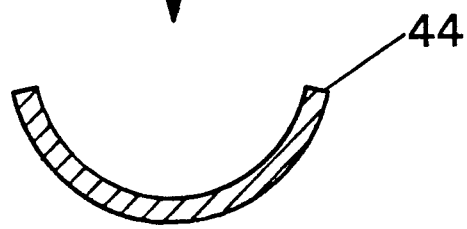

A thin honeycomb molding 1 as shown in FIG. 3(a) was immersed in hot water 9 at 75° C. containing 0.1% by weight of anion surfactant (FIG. 3(b)) to gel the binder (METOLOSE 60 SH-4000). Then, as shown in FIG. 3(c), the honeycomb molding 1 was placed on a curved heat-resistant jig 3 (with porosity of 30% containing 80% by weight of alumina and 20% by weight of silica) having water absorptivity, and was curved to have a radius of curvature of 60 mm. Next, under this condition, the honeycomb molding was dried at 120° C. for 10 minutes, followed by the heat treatment at 1,200° C. for one hour, obtaining a curved honeycomb shaped ceramic 44 (FIG. 3(d)).

Method B

Figure 4A:
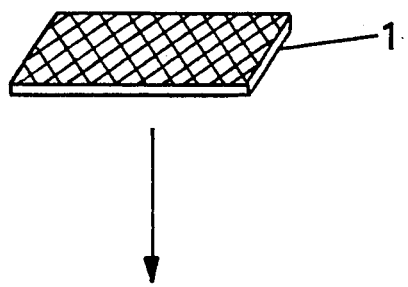
FIG. 4 shows a series of steps of method B for producing a honeycomb shaped ceramic of one example of the present invention.
Figure 4B:
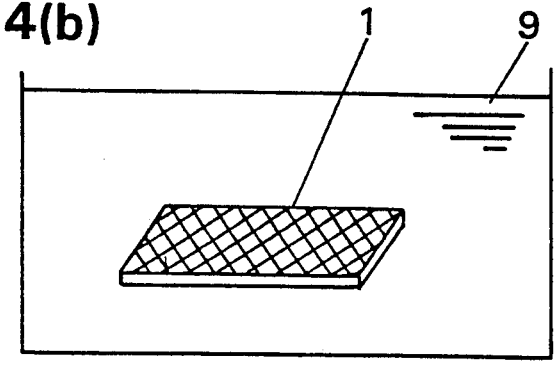
Figure 4C:
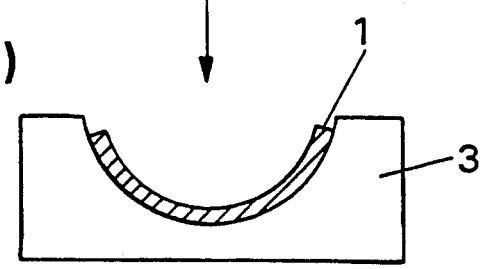
Figure 4D:
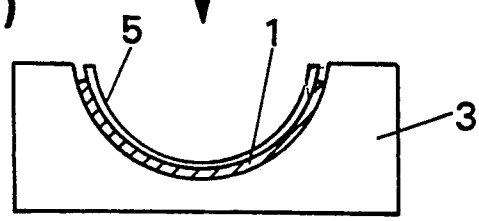
Figure 4E:

A thin honeycomb molding 1 shown in FIG. 4(a) was immersed in hot water 9 at 75° C. containing 0.1% by weight of anion surfactant for 10 minutes (FIG. 4(b)) to gel the binder (METOLOSE 60 SH-4000). After that, as shown in FIGS. 4(c) and 4(d), the honeycomb molding 1 was sandwiched between a curved heat-resistant jig 3 and a heat-resistant presser jig 5 (with each porosity of 30% containing 80% by weight of alumina and 20% by weight of silica) having water absorptivity so that the honeycomb molding 1 had a radius of curvature of 60 mm. Under this condition, the honeycomb molding was dried at 120° C. for 10 minutes, followed by a heat treatment at 1,200° C. for one hour, thereby obtaining a curved honeycomb shaped ceramic 45 (FIG. 4(e)).

Method C

Figure 5A:
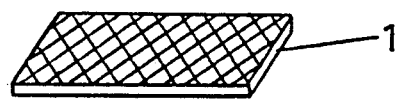
FIG. 5 shows a series of steps of method C for producing a honeycomb shaped ceramic of one example of the present invention.
Figure 5B:
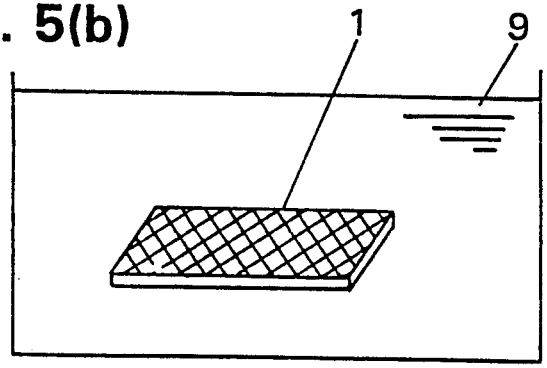
Figure 5C:
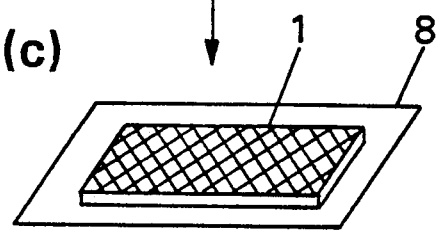
Figure 5D:
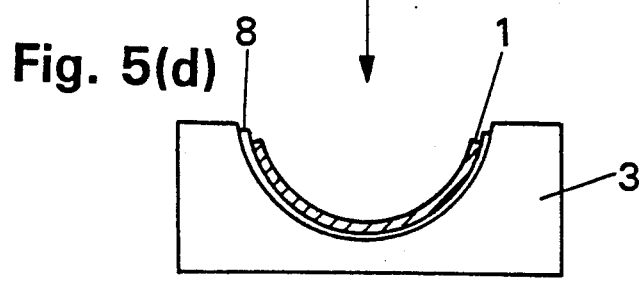
Figure 5E:
Figure 6A:
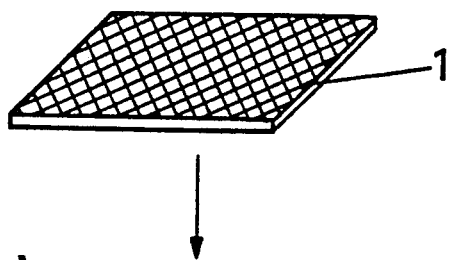
FIG. 6 shows a series of steps for producing a curved honeycomb shaped ceramic of one example of the present invention.
Figure 6B:
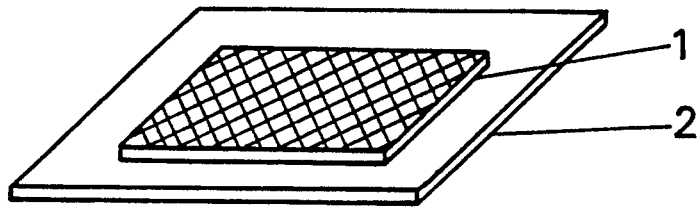
Figure 6C:
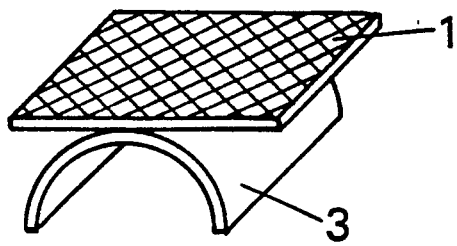
Figure 6D:
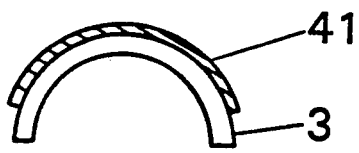
Figure 6E:

A thin honeycomb molding 1 shown in FIG. 5(a) was immersed in hot water 9 at 75° C. containing 0.1% by weight of anion surfactant for 10 minutes (FIG. 5(b)) to gel the binder (METOLOSE 60 SH-4000). After that, as shown in FIG. 5(c), the honeycomb molding 1 was placed on a sheet 8 (with density of 30 g/m²), and the honeycomb molding on the sheet was transferred onto a heat-resistant jig 3 (with porosity of 30% containing 80% by weight of alumina and 20% by weight of silica) having water absorptivity (FIG. 5(d)). The honeycomb molding on the sheet on the jig 3 was curved to have a radius of curvature of 60 mm. Under this condition, the honeycomb molding was dried at 120° C. for 10 minutes, followed by a heat treatment at 1,200° C. for one hour, thereby obtaining a curved honeycomb shaped ceramic 46 (FIG. 5(e)).

Table 1 shows the results of the honeycomb shaped ceramics obtained by the above-mentioned methods A, B, and C.

TABLE 1

| Thickness (mm) | Method A | Method B | Method C |
| --- | --- | --- | --- |
| 1.0 | X | X | ○ |
| 2.0 | △ | △ | ○ |
| 3.0 | ○ | ○ | ○ |
| 4.0 | ○ | ○ | ○ |
| 5.0 | ○ | ○ | ○ |
| 6.0 | ○ | ○ | ○ |
| 7.0 | △ | ○ | △ |
| 8.0 | X | ○ | X |
| 9.0 | X | ○ | X |
| 10.0 | X | ○ | X |

○: a thin honeycomb shaped ceramic with the intended curved shape was obtained.
△: a thin honeycomb shaped ceramic with the intended curved shape was not always obtained.
X: a thin honeycomb shaped ceramic with the intended curved shape was not obtained.

As a result, in method A, the thin honeycomb shaped ceramics with a thickness of 3.0 to 6.0 mm had the intended curved shape. In method B, the thin honeycomb shaped ceramics with a thickness of 3.0 to 10.0 mm had the intended curved shape. In method C, the thin honeycomb shaped ceramics with a thickness of 1.0 to 6.0 mm had the intended curved shape. In the methods A and B, from the view point of the production, it was difficult to obtain the honeycomb shaped ceramic with a thickness of 2.0 mm or less. More specifically, the honeycomb molding was likely to be damaged while placing it onto the heat-resistant jig from the hot water. In the methods A and C, from the view point of the production, it was difficult to obtain the honeycomb shaped ceramic with a thickness of 7.0 or more. More specifically, the honeycomb molding was likely to detach itself come off from the heat-resistant jig while being dried, and therefore, the desired radius of curvature was not obtained.

EXAMPLE 10

First, 10 parts by weight of rehydratable alumina, 85 parts by weight of fused silica, 5 parts by weight of 6-potassium titanate, and as a binder, 6.5 parts by weight of METOLOSE 60 SH-4000 (produced by Shinetsu Kagaku Kogyo) were mixed, after which as a plasticizer, 2.5 parts by weight of sorbitan acid ester and water were added, followed by kneading. The resulting composition was extruded and dried by dielectric heating, thereby obtaining a honeycomb molding having a width of 150 mm × 70 mm, a length of 150 mm, and a cell density of 60 cell/in² (a cell pitch of 3.3 mm and a rib thickness of 0.40 mm). Then, the honeycomb molding was cut into pieces with a thickness of 1.0, 2.0, 3.0, 4.0, 5.0, 6.0, 7.0, 8.0, 9.0, and 10.0 mm, respectively. After that, in accordance with the same production methods A, B, and C as in Example 9, curved honeycomb shaped ceramics were obtained. The results are shown in Table 2.

TABLE 2

| Thickness (mm) | Method A | Method B | Method C |
| --- | --- | --- | --- |
| 1.0 | X | X | X |
| 2.0 | X | X | △ |
| 3.0 | X | X | ○ |
| 4.0 | △ | △ | ○ |
| 5.0 | ○ | ○ | ○ |
| 6.0 | ○ | ○ | ○ |
| 7.0 | ○ | ○ | ○ |
| 8.0 | ○ | ○ | ○ |
| 9.0 | ○ | ○ | ○ |
| 10.0 | △ | ○ | △ |

○: a thin honeycomb shaped ceramic with the intended curved shape was obtained.
△: a thin honeycomb shaped ceramic with the intended curved shape was not always obtained.
X: a thin honeycomb shaped ceramic with the intended curved shape was not obtained.

As a result, in method A, the thin honeycomb shaped ceramics with a thickness of 5.0 to 9.0 mm had the intended curved shape. In method B, the thin honeycomb shaped ceramics with a thickness of 5.0 to 10.0 mm had the intended curved shape. In method C, the thin honeycomb shaped ceramics with a thickness of 3.0 to 9.0 mm had the intended curved shape. In the methods A and B, from the view point of production, it was difficult to obtain the honeycomb shaped ceramic with a thickness of 4.0 mm or less. More specifically, the honeycomb molding was likely to be damaged while being moved onto the heat-resistant jig from the hot water. In the methods A and C, from the view point of the production, it was difficult to obtain the honeycomb shaped ceramic with a thickness of 10.0 or more. More specifically, the honeycomb molding was likely to detach itself come off from the heat-resistant jig while being dried, and therefore, the desired radius of curvature was not obtained.

In this example, the flexibility of the honeycomb molding in the hot water was increased by increasing an added amount of plasticizer by 1.0 parts by weight. As a result, the honeycomb shaped ceramic which was thicker than that of Example 9 was transformed into the intended shape. However, it was difficult to handle a thin molding. These results indicate that it is necessary to add a plasticizer in a great amount in order to obtain a thick curved honeycomb shaped ceramic.

EXAMPLE 11

First, 10 parts by weight of rehydratable alumina, 85 parts by weight of fused silica, 5 parts by weight of 6-potassium titanate, and as a binder, 9 parts by weight of METOLOSE 60 SH-4000 (produced by Shinetsu Kagaku Kogyo) were mixed, after which as a plasticizer, 2.5 parts by weight of sorbitan acid ester and water were added, followed by kneading. The resulting composition was extruded and dried by dielectric electric heating, thereby obtaining a honeycomb molding having widths of 150 mm × 70 mm, a length of 150 mm, and a cell density of 60 cell/in² (a cell pitch of 3.3 mm and a rib thickness of 0.40 mm) was obtained. Then, the honeycomb molding was cut into pieces with a thickness of 1.0, 2.0, 3.0, 4.0, 5.0, 6.0, 7.0, 8.0, 9.0, and 10.0 mm, respectively. After that, in accordance with the same production methods A, B, and C as in Example 9, the curved honeycomb shaped ceramics were obtained. The results are shown in Table 3.

TABLE 3

| Thickness (mm) | Method A | Method B | Method C |
| --- | --- | --- | --- |
| 1.0 | X | X | O |
| 2.0 | Δ | Δ | O |
| 3.0 | O | O | O |
| 4.0 | O | O | O |
| 5.0 | O | O | O |
| 6.0 | O | O | O |
| 7.0 | Δ | O | Δ |
| 8.0 | X | O | X |
| 9.0 | X | O | X |
| 10.0 | X | O | X |

O: a thin honeycomb shaped ceramic with the intended curved shape was obtained.
Δ: a thin honeycomb shaped ceramic with the intended curved shape was not always obtained.
X: a thin honeycomb shaped ceramic with the intended curved shape was not obtained.

As a result, in method A, the thin honeycomb shaped ceramics with a thickness of 3.0 to 6.0 mm had the intended curved shape. In method B, the thin honeycomb shaped ceramics with a thickness of 3.0 to 10.0 mm had the intended curved shape. In method C, the thin honeycomb shaped ceramics with a thickness of 1.0 to 6.0 mm had the intended curved shape. In the methods A and B, from the view point of production, it was difficult to obtain the honeycomb shaped ceramic with a thickness of 2.0 mm or less. More specifically, the honeycomb molding was likely to be damaged while being moved onto the heat-resistant jig from the hot water. In the methods A and C, from the view point of production, it was difficult to obtain the honeycomb shaped ceramic with a thickness of 7.0 mm or more. More specifically, the honeycomb molding was likely to detach itself from the heat-resistant jig while being dried, and therefore, the desired radius of curvature was not obtained.

In this example, the mechanical strength of the honeycomb molding in the hot water was increased by increasing an added amount of binder by 2.5 parts by weight compared with Example 14. This results in that the range in the thickness of the curved ceramic molding with the intended shape was the same as that of Example 9.

Examples 9 to 11 indicate that there was a closer relationship between the binder and the plasticizer of this invention.

EXAMPLE 12

First, 10 parts by weight of rehydratable alumina, 85 parts by weight of fused silica, 5 parts by weight of 6-potassium titanate, and as a binder, 9 parts by weight of METOLOSE 60 SH-4000 (produced by Shinetsu Kagaku Kogyo) were mixed, after which as a plasticizer, 1.5 parts by weight of sorbitan acid ester and water were added, followed by kneading. The resulting composition was extruded and dried by dielectric heating, thereby obtaining a honeycomb molding having widths of 150 mm × 70 mm, a length of 150 mm, and a cell density of 300 cell/in$^2$ (a cell pitch of 1.47 mm and a rib thickness of 0.20 mm) was obtained. Then, the honeycomb molding was cut into pieces with a thickness of 1.0, 2.0, 3.0, 4.0, 5.0, 6.0, 7.0, 8.0, 9.0, and 10.0 mm, respectively. After that, in accordance with the same production methods A, B, and C as in Example 9, curved honeycomb shaped ceramics were obtained. The results are shown in Table 4.

TABLE 4

| Thickness (mm) | Method A | Method B | Method C |
| --- | --- | --- | --- |
| 1.0 | X | X | Δ |
| 2.0 | X | X | O |
| 3.0 | Δ | Δ | O |
| 4.0 | O | O | O |
| 5.0 | Δ | O | Δ |
| 6.0 | X | O | X |
| 7.0 | X | O | X |
| 8.0 | X | O | X |
| 9.0 | X | O | X |
| 10.0 | X | O | X |

O: a thin honeycomb shaped ceramic with the intended curved shape was obtained.
Δ: a thin honeycomb shaped ceramic with the intended curved shape was not always obtained.
X: a thin honeycomb shaped ceramic with the intended curved shape was not obtained.

As a result, in method A, the thin honeycomb shaped ceramics with a thickness of 4.0 mm had the intended curved shape. In method B, the thin honeycomb shaped ceramics with a thickness of 4.0 to 10.0 mm had the intended curved shape. In method C, the thin honeycomb shaped ceramics with a thickness of 2.0 to 4.0 mm had the intended curved shape. In the methods A and B, from the view point of production, it was difficult to obtain the honeycomb shaped ceramic with a thickness of 3.0 mm or less. In method C, from the view point of production, it was difficult to obtain the ceramic molding with a thickness of 1.0 mm or less. More specifically, the honeycomb molding was likely to be damaged while being moved onto the heat-resistant jig from the hot water. In the methods A and C, from the view point of production, it was difficult to obtain the honeycomb shaped ceramic with a thickness of 5.0 mm or more. More specifically, the honeycomb molding was likely to detach itself from the heat-resistant jig while being dried, and therefore, the desired radius of curvature was not obtained.

In this example (300 cell/in$^2$), the cell density was higher than that of Example 9 (60 cell/in$^2$), which makes it difficult to form a curved molding. This is because the cell walls were increased as the cell density became higher, so that the resistance with respect to the bending caused by the cell walls were increased, when the flat honeycomb molding was bent by the load of its own weight or by applying a load thereon.

EXAMPLE 13

First, 10 parts by weight of rehydratable alumina, 85 parts by weight of fused silica, 5 parts by weight of 6-potassium titanate, and as a binder, 9 parts by weight of METOLOSE 60 SH-4000 (produced by Shinetsu Kagaku Kogyo) were mixed, after which as a plasticizer, 2.5 parts by weight of sorbitan acid ester and water were added, followed by kneading. The resulting composition was extruded and dried by dielectric heating, thereby obtaining a honeycomb molding having widths of 150 mm × 70 mm, a length of 150 mm, and a cell density of 300 cell/in$^2$ (a cell pitch of 1.47 mm and a rib thickness of 0.20 mm). Then, the honeycomb molding was cut into pieces with a thickness of 1.0, 2.0, 3.0, 4.0, 5.0, 6.0, 7.0, 8.0, 9.0, and 10.0 mm, respectively. After that, in accordance with the same production methods A, B, and C as in Example 9, curved honeycomb shaped ceramics were obtained. The results are shown in Table 5.

TABLE 5

| Thickness (mm) | Method A | Method B | Method C |
| --- | --- | --- | --- |
| 1.0 | X | X | X |
| 2.0 | X | X | X |
| 3.0 | X | X | Δ |
| 4.0 | Δ | Δ | ○ |
| 5.0 | ○ | ○ | ○ |
| 6.0 | ○ | ○ | ○ |
| 7.0 | Δ | ○ | Δ |
| 8.0 | X | ○ | X |
| 9.0 | X | ○ | X |
| 10.0 | X | ○ | X |

○: a thin honeycomb shaped ceramic with the intended curved shape was obtained.
Δ: a thin honeycomb shaped ceramic with the intended curved shape was not always obtained.
X: a thin honeycomb shaped ceramic with the intended curved shape was not obtained.

As a result, in method A, the thin honeycomb shaped ceramics with a thickness of 5.0 mm and 6.0 mm had the intended curved shape. In method B, the thin honeycomb shaped ceramics with a thickness of 5.0 to 10.0 mm had the intended curved shape. In method C, the thin honeycomb shaped ceramics with a thickness of 4.0 to 6.0 mm had the intended curved shape. In methods A and B, from the view point of production, it was difficult to obtain the honeycomb shaped ceramic with a thickness of 4.0 mm or less. In method C, from the view point of production, it was difficult to obtain the honeycomb shaped ceramic with a thickness of 3.0 mm or less. More specifically, the honeycomb molding was likely to be damaged while being moved onto the heat-resistant jig from the hot water. In the methods A and C, from the view point of production, it was difficult to obtain the honeycomb shaped ceramic with a thickness of 7.0 mm or more. More specifically, the honeycomb molding was likely to detach itself from the heat-resistant jig while being dried, and therefore, the desired radius of curvature was not obtained.

In this example, as in the comparison between Examples 9 and 12, it became more difficult to form a curved molding than that of Example 10 due to the high cell density, as described in Example 12 compared with Example 9.

Moreover, in this example, the flexibility of the honeycomb molding in the hot water was increased by increasing the added amount of the plasticizer compared with Example 12. As a result, the honeycomb molding which was thicker than that of Example 12 was able to be bent into the intended shape. However, it was more difficult to handle the thin honeycomb molding than that of Example 12.

EXAMPLE 14

First, 10 parts by weight of rehydratable alumina, 85 parts by weight of fused silica, 5 parts by weight of 6-potassium titanate, and as a binder, 9 parts by weight of METOLOSE 60 SH-4000 (produced by Shinetsu Kagaku Kogyo) were mixed, after which as a plasticizer, 2.5 parts by weight of sorbitan acid ester and water were added, followed by kneading. The resulting composition was extruded and dried by dielectric heating, thereby obtaining a honeycomb molding having widths of 150 mm × 70 mm, a length of 150 mm, and a cell density of 300 cell/in$^2$ (a cell pitch of 1.47 mm and a rib thickness of 0.20 mm). Then, the honeycomb molding was cut into pieces with a thickness of 1.0, 2.0, 3.0, 4.0, 5.0, 6.0, 7.0, 8.0, 9.0, and 10.0 mm, respectively. After that, the temperatures of the hot water in the methods A, B, and C were changed to 95° C, thereby obtaining the curved honeycomb shaped ceramic. The results are shown in Table 6.

TABLE 6

| Thickness (mm) | Method A | Method B | Method C |
| --- | --- | --- | --- |
| 1.0 | X | X | ○ |
| 2.0 | Δ | Δ | ○ |
| 3.0 | ○ | ○ | ○ |
| 4.0 | ○ | ○ | ○ |
| 5.0 | ○ | ○ | ○ |
| 6.0 | ○ | ○ | ○ |
| 7.0 | Δ | ○ | Δ |
| 8.0 | X | ○ | X |
| 9.0 | X | ○ | X |
| 10.0 | X | ○ | X |

○: a thin honeycomb shaped ceramic with the intended curved shape was obtained.
Δ: a thin honeycomb shaped ceramic with the intended curved shape was not always obtained.
X: a thin honeycomb shaped ceramic with the intended curved shape was not obtained.

As a result, in method A, the thin honeycomb shaped ceramics with a thickness of 3.0 to 6.0 mm had the intended curved shape. In method B, the thin honeycomb shaped ceramics with a thickness of 3.0 to 10.0 mm had the intended curved shape. In method C, the thin honeycomb shaped ceramics with a thickness of 6.0 mm or less had the intended curved shape. In the methods A and B, from the view point of production, it was difficult to obtain the honeycomb shaped ceramic with a thickness of 2.0 mm or less. More specifically, the honeycomb molding was likely to be damaged while being moved onto the heat-resistant jig from the hot water. In the methods A and C, from the view point of production, it was difficult to obtain the honeycomb shaped ceramic with a thickness of 7.0 mm or more. More specifically, the honeycomb molding was likely to detach itself from the heat-resistant jig while being dried, and therefore, the desired radius of curvature was not obtained.

In this example, the temperature of the hot water was higher than that of Example 13 by 20° C., thereby increasing the mechanical strength of the honeycomb molding in the hot water and making it easier to handle the thin honeycomb molding. Moreover, after the honeycomb molding was transferred onto the heat-resistant jig, the temperature of the honeycomb molding was decreased to some degree to cause a great amount of flexibility. This results in that the honeycomb molding with a wider range of thickness was bent into the intended shape in this example compared with Examples 12 and 13.

Accordingly, the moldability for bending the honeycomb molding was improved even by regulating the temperature of the hot water as shown in this example.

COMPARATIVE EXAMPLE 3

The honeycomb moldings with a thickness of 2.0 to 6.0 mm obtained in Example 9 were immersed in hot water at 75° C. containing 0.1% by weight of anion surfactant for 10 minutes to gel the binder (METOLOSE 60 SH-4000), whereby the honeycomb moldings were provided with flexibility. After that, the honeycomb moldings were placed on the heat-resistant jig (made of alumina and with porosity of 0.5% or less) with a curved shape so that the radius of curvature was 60 mm. The jig does not have water absorptivity. Then, under this condition, the honeycomb moldings were dried at 120° C. for 10 minutes, followed by the heat treatment at 200° C. for one hour.

As a result, the honeycomb shaped ceramics with a thickness of 3.0 and 4.0 mm had the intended curved shape. It was difficult to transfer the honeycomb molding with a thickness of 2.0 mm onto the heat-resistant jig from the hot water. The honeycomb moldings with a thickness of 5.0 mm or more come off from the curved jig, and the honeycomb shaped ceramics obtained did not have the intended radius of curvature. This was caused by the removal of the honeycomb molding from the curved jig due to the vapor evaporating from the honeycomb molding while being dried.

EXAMPLE 15

First, 10 parts by weight of rehydratable alumina, 85 parts by weight of fused silica, 5 parts by weight of 6-potassium titanate, an appropriate amount of binders of cellulose fiber and fats and oils, and water were mixed and kneaded. The resulting composition was molded by extrusion and dried by dielectric heating, thereby obtaining a honeycomb molding having width of 100 mm×70 mm, a length of 150 mm, and a cell density of 300 cell/in$^2$ (a cell pitch of 1.47 mm and a rib thickness of 0.20 mm). Then, the resulting thick honeycomb molding was cut into a thickness of 1.5 mm, and the thin honeycomb molding 1 was placed on a mullite plate 2 as shown in FIG. 6.

The honeycomb molding on the mullite plate was preliminarily heated at a temperature in the range of 1,000° to 1,200° C. for one hour (first sintering), and the first-sintered honeycomb molding was placed on a heat-resistant jig 3 (80% by weight of alumina and 20% by weight of silica) with a radius of curvature of 30 mm, followed by further sintering at a temperature in the range of 1,100° to 1,300° C. for one hour (second sintering). Thus, the curved honeycomb shaped ceramic 41 was obtained. Table 1 shows the results when the temperatures of the first and second sintering are varied.

TABLE 7

| No. | Temperature of the first sintering (°C.) | Temperature of the second sintering (°C.) | Result |
|---|---|---|---|
| 1 | 1,000 | 1,150 | X |
| 2 | 1,050 | 1,100 | Δ |
| 3 | 1,050 | 1,150 | ○ |
| 4 | 1,050 | 1,200 | ○ |
| 5 | 1,050 | 1,250 | ○ |
| 6 | 1,050 | 1,300 | ○ |
| 7 | 1,050 | 1,350 | X |
| 8 | 1,100 | 1,150 | Δ |
| 9 | 1,100 | 1,200 | ○ |
| 10 | 1,100 | 1,250 | ○ |
| 11 | 1,100 | 1,300 | ○ |
| 12 | 1,100 | 1,350 | X |
| 13 | 1,150 | 1,150 | Δ |
| 14 | 1,150 | 1,200 | Δ |
| 15 | 1,150 | 1,250 | Δ |
| 16 | 1,150 | 1,300 | ○ |
| 17 | 1,150 | 1,350 | X |
| 18 | 1,200 | 1,200 | Δ |
| 19 | 1,200 | 1,250 | Δ |
| 20 | 1,200 | 1,300 | Δ |

○: a curved honeycomb shaped ceramic with the intended shape was obtained.
Δ: a curved honeycomb shaped ceramic with the intended shape was not obtained.
X: a physical property of the curved honeycomb shaped ceramic was poor or cracks occurred therein.

As shown in Table 7, cracks occurred in the curved honeycomb shaped ceramic, when the temperature of the first sintering was as low as 1,000° C., and the physical property of the curved honeycomb shaped ceramic obtained was poor, when the temperature of the second sintering was 1,350° C. The curved honeycomb shaped ceramic with the intended shape was obtained, when the temperature of the first sintering was different from that of the second sintering by about 100° C.

When the temperature of the first sintering was 1,150° C. or more, the honeycomb molding was sintered enough and had excellent mechanical strength. In this case, it was not adequate that the temperature of the first sintering was different from that of the second sintering by about 100° C.

Figure 7:
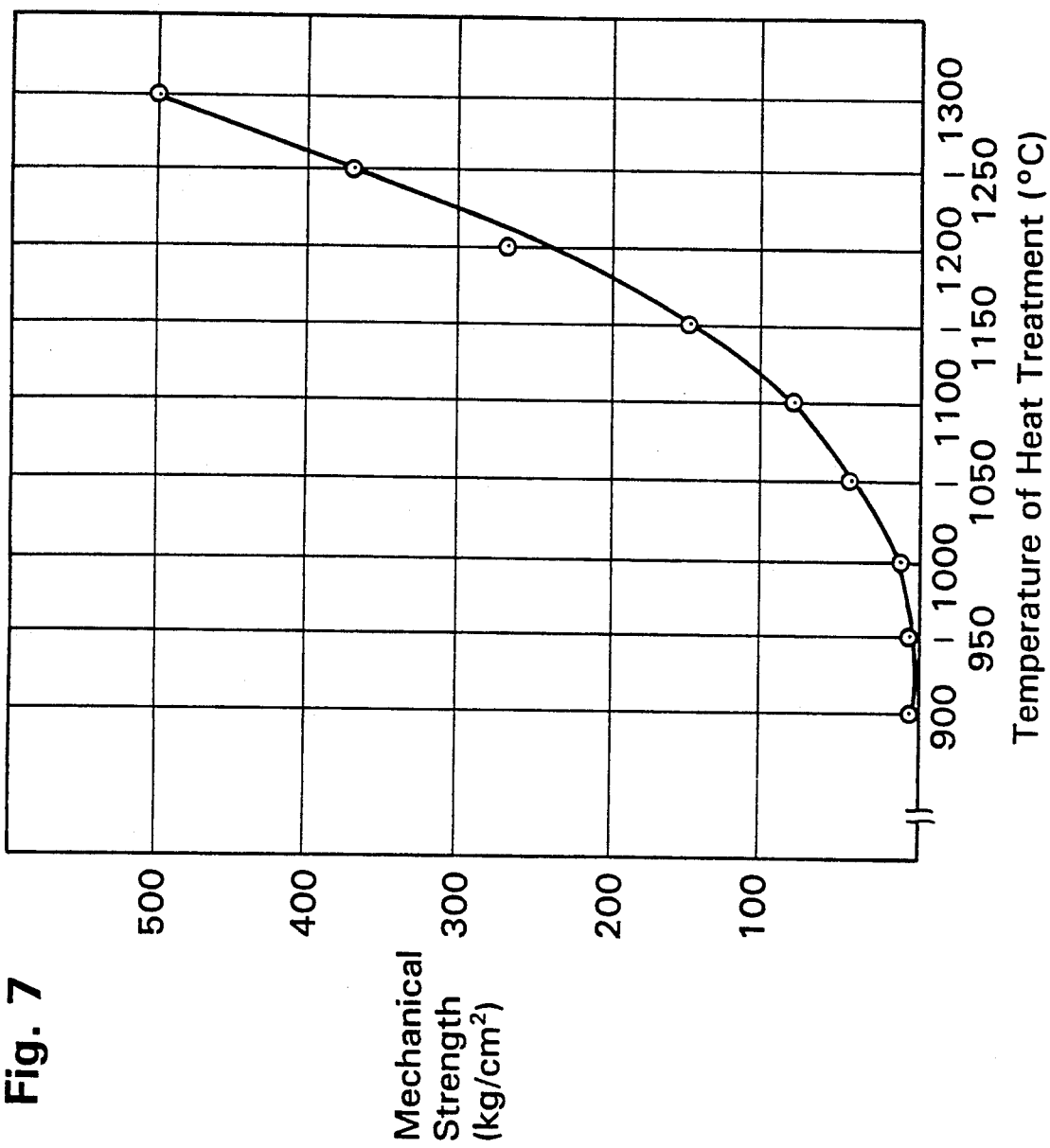
FIG. 7 is a graph showing the relationship between the temperature of heat treatment and the mechanical strength of a ceramic in the production process of FIG. 6.
Figure 8A:
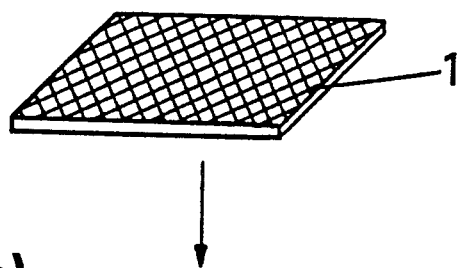
FIG. 8 shows a series of steps for producing a curved honeycomb shaped ceramic of one example of the present invention.
Figure 8B:
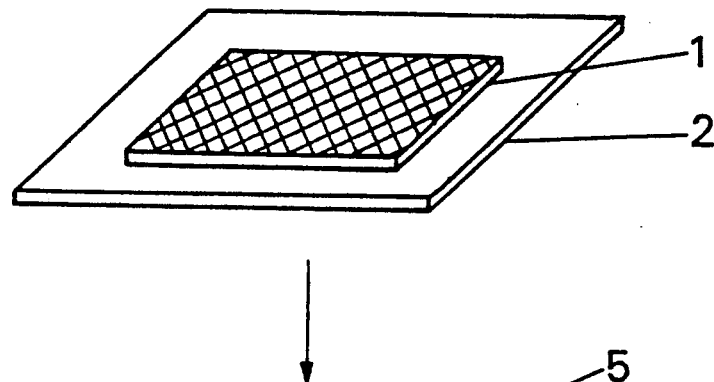
Figure 8C:
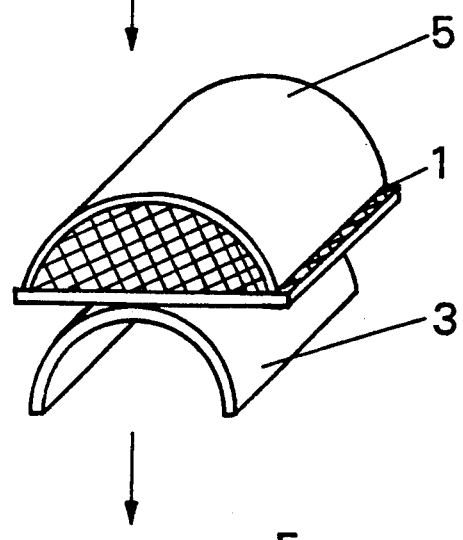
Figure 8D:
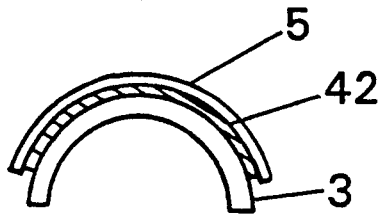
Figure 8E:
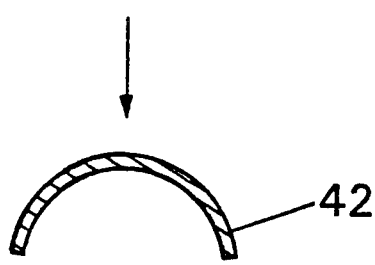

Further experiments were conducted to find reasons for the above as follows. A composition containing 10 parts by weight of hydraulic alumina, 85 parts by weight of fused silica, 5 parts by weight of 6-potassium titanate was extruded to obtain a honeycomb molding. The honeycomb molding was sintered at various temperatures, and the mechanical strength of the sintered honeycomb shaped ceramic was measured as compressive strength in the direction of the honeycomb lattice of the ceramic with a dimension of 10 mm×10 mm×10 mm. The results are shown in Table 8 and FIG. 7.

TABLE 8

| Heat treatment temperature (°C.) | Mechanical strength (kg/cm$^2$) |
|---|---|
| 900 | 6 |
| 950 | 6 |
| 1,000 | 8 |
| 1,050 | 40 |
| 1,100 | 80 |
| 1,150 | 150 |
| 1,200 | 270 |
| 1,250 | 370 |
| 1,300 | 500 |

As shown in Table 8, a honeycomb molding with the above components is rapidly sintered when or after the temperature rises to 1,100° C. Therefore, the honeycomb molding begins to sinter and does not have a great degree of mechanical strength yet in the range of temperature of the first sintering of the present invention.

EXAMPLE 16

The honeycomb molding 1 with a thickness of 1.5 mm obtained in Example 9 was placed on the mullite plate 2, followed by sintering at a temperature in the range of 1,000° to 1,200° C. for one hour (first sintering). After that, the honeycomb molding was placed on a heat-resistant jig 3 (80% by weight of alumina and 20% by weight of silica) with a radius of curvature of 15 mm and was sintered at a temperature in the range of 1,100° to 1,300° C. for one hour (second sintering), obtaining a curved honeycomb shaped ceramic 41. The results are shown in Table 9.

TABLE 9

| No. | Temperature of the first sintering (°C.) | Temperature of the second sintering (°C.) | Result |
|---|---|---|---|
| 1 | 1,000 | 1,150 | X |
| 2 | 1,050 | 1,150 | Δ |
| 3 | 1,050 | 1,200 | Δ |
| 4 | 1,050 | 1,250 | ○ |
| 5 | 1,050 | 1,300 | ○ |
| 6 | 1,050 | 1,350 | X |
| 7 | 1,100 | 1,200 | Δ |
| 8 | 1,100 | 1,250 | Δ |
| 9 | 1,100 | 1,300 | ○ |
| 10 | 1,100 | 1,350 | X |
| 11 | 1,150 | 1,250 | Δ |
| 12 | 1,150 | 1,300 | Δ |
| 13 | 1,150 | 1,350 | X |

TABLE 9-continued

| No. | Temperature of the first sintering (°C.) | Temperature of the second sintering (°C.) | Result |
|---|---|---|---|
| 14 | 1,200 | 1,300 | Δ |

○: a curved honeycomb shaped ceramic with the intended shape was obtained.
Δ: a curved honeycomb shaped ceramic with the intended shape was not obtained.
X: a physical property of the curved honeycomb shaped ceramic was poor or cracks occurred therein.

As a result, the curved honeycomb shaped ceramic 41 with the intended shape was obtained with the temperature of the first sintering different from that of the second sintering by about 200° C. In this example, the heat-resistant jig 3 had a smaller radius of curvature than that of Example 15, and therefore, it was required that the difference of the temperatures between the first sintering and the second sintering was greater than that of Example 15 in order to bend the honeycomb molding to an intended degree.

EXAMPLE 17

As shown in FIG. 8, the honeycomb molding 1 with a thickness of 1.5 mm obtained in Example 15 was placed on the mullite plate 2, followed by sintering at a temperature in the range of 1,000° to 1,200° C. for one hour (first sintering). After that, the honeycomb shaped ceramic was placed on the heat-resistant jig 3 with a radius of curvature of 15 mm (80% by weight of alumina and 20% by weight of silica), and a heat-resistant presser jig 5 was placed on the honeycomb shaped ceramic, followed by the further heat treatment at a temperature in the range of 1,100° to 1,300° C. for one hour (second sintering). The result are shown in Table 10.

TABLE 10

| No. | Temperature of the first sintering (°C.) | Temperature of the second sintering (°C.) | Result |
|---|---|---|---|
| 1 | 1,000 | 1,150 | X |
| 2 | 1,050 | 1,100 | Δ |
| 3 | 1,050 | 1,150 | ○ |
| 4 | 1,050 | 1,200 | ○ |
| 5 | 1,050 | 1,250 | ○ |
| 6 | 1,050 | 1,300 | ○ |
| 7 | 1,050 | 1,350 | X |
| 8 | 1,100 | 1,150 | Δ |
| 9 | 1,100 | 1,200 | Δ |
| 10 | 1,100 | 1,250 | ○ |
| 11 | 1,100 | 1,300 | ○ |
| 12 | 1,100 | 1,350 | X |
| 13 | 1,150 | 1,200 | Δ |
| 14 | 1,150 | 1,250 | Δ |
| 15 | 1,150 | 1,300 | ○ |
| 16 | 1,150 | 1,350 | X |
| 17 | 1,200 | 1,250 | Δ |
| 18 | 1,200 | 1,300 | Δ |

○: a curved honeycomb shaped ceramic with the intended shape was obtained.
Δ: a curved honeycomb shaped ceramic with the intended shape was not obtained.
X: a physical property of the curved honeycomb shaped ceramic was poor or cracks occurred therein.

As shown in Table 10, when the temperature of the first sintering was different from that of the second sintering by 100° to 150° C., the honeycomb shaped ceramic 42 with the intended shape was obtained. In this example, the second sintering was performed with the presser jig 5 loaded on the sinter. Therefore, even though the temperature of the first sintering was different from that of the second sintering to a smaller degree than that of Example 16, a honeycomb shaped ceramic with the intended shape was obtained.

COMPARATIVE EXAMPLE 4

The honeycomb molding 1 with a thickness of 1.5 mm obtained in Example 15 was placed on the heat-resistant jig 3 (80% by weight of alumina and 20% by weight of silica) with a radius of curvature of 30 mm, followed by the heat treatment at 1,200° C. for one hour. The honeycomb shaped ceramic obtained had cracks linearly on the top of the curve with which the heat-resistant jig 3 is in contact.

EXAMPLE 18

Figure 9A:
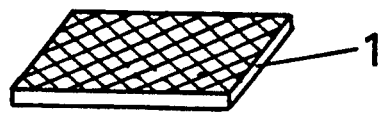
FIG. 9 shows a series of steps for producing a curved honeycomb shaped ceramic of one example of the present invention.

First, 10 parts by weight of rehydratable alumina, 85 parts by weight of fused silica, 5 parts by weight of 6-potassium titanate, and as a binder, 6 parts by weight of METOLOSE 60SH-4000 (produced by Shinetsu Kagaku Kogyo) were mixed, after which as a plasticizer, 1.5 parts by weight of sorbitan acid ester and water were added, and the mixture was kneaded. The resulting composition was extruded and dried by dielectric heating, obtaining a honeycomb molding having width of 200 mm×50 mm, a length of 150 mm, a cell density of 90 cell/in$^2$ (a cell pitch of 2.5 mm and a rib thickness of 0.30 mm). Then, the honeycomb molding was cut into a pieces with a thickness of 2.5 mm, and a honeycomb molding 1 was obtained as shown in FIG. 9(a).

Figure 9B:
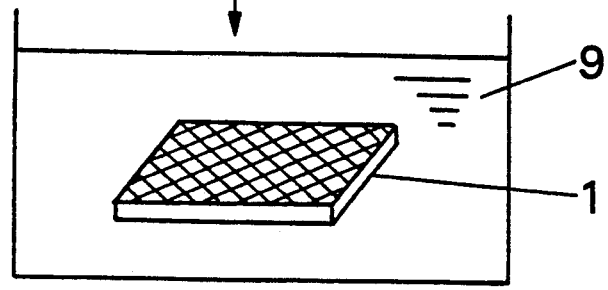
Figure 9C:
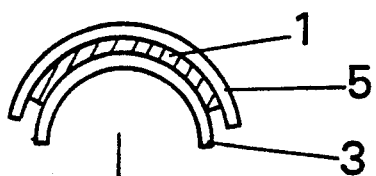
Figure 9D:
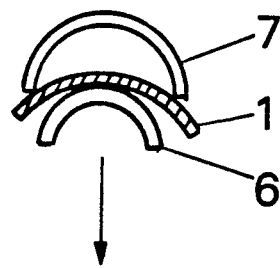
Figure 9E:
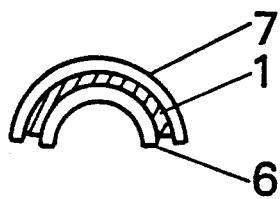
Figure 9F:

Next, as shown in FIG. 9(b), the honeycomb molding 1 was immersed in hot water 9 at 75° C. containing 0.1% by weight of anion surfactant for 10 minutes to gel the binder. After that, as shown in FIG. 9(c), the honeycomb molding 1 was sandwiched between a pair of curved heat-resistant jigs 3 and 5, thereby obtaining a curved honeycomb molding with a radius of curvature of 25 mm. Then, under this condition, the honeycomb molding was dried at 120° C. for 10 minutes, followed by the heat treatment at a temperature in the range of 1,000° to 1,200° C. for one hour (first sintering). As shown in FIG. 9(d), the honeycomb molding was transferred onto a heat-resistant jig 6 with a radius of curvature of 13 mm, and a heat-resistant presser jig 7 was placed thereon, followed by further heat treatment at a temperature in the range of 1,100° to 1,350° C. for one hour (second sintering)(FIG. 9(e)) to obtain a honeycomb shaped ceramic (FIG. 9(f)).

Table 11 shows the results when the temperatures of the first and second sinterings are varied.

TABLE 11

| No. | Temperature of the first sintering (°C.) | Temperature of the second sintering (°C.) | Result |
|---|---|---|---|
| 1 | 1,000 | 1,150 | X |
| 2 | 1,050 | 1,100 | Δ |
| 3 | 1,050 | 1,150 | Δ |
| 4 | 1,050 | 1,200 | ○ |
| 5 | 1,050 | 1,250 | ○ |
| 6 | 1,050 | 1,300 | ○ |
| 7 | 1,050 | 1,350 | X |
| 8 | 1,100 | 1,150 | Δ |
| 9 | 1,100 | 1,200 | Δ |
| 10 | 1,100 | 1,250 | ○ |
| 11 | 1,100 | 1,300 | ○ |
| 12 | 1,100 | 1,350 | X |
| 13 | 1,150 | 1,200 | Δ |
| 14 | 1,150 | 1,250 | Δ |
| 15 | 1,150 | 1,300 | ○ |
| 16 | 1,150 | 1,350 | X |
| 17 | 1,200 | 1,250 | Δ |

TABLE 11-continued

| No. | Temperature of the first sintering (°C.) | Temperature of the second sintering (°C.) | Result |
|---|---|---|---|
| 18 | 1,200 | 1,300 | Δ |

○: a honeycomb shaped ceramic with the intended shape was obtained.
Δ: a honeycomb shaped ceramic with the intended shape was not obtained.
X: a physical property of the honeycomb shaped ceramic was poor or cracks occurred therein.

As shown in Table 11, when the temperature of the first sintering was 1,000° C., cracks occurred in the honeycomb molding 1, and when the temperature of the second sintering was 1,350° C., the physical property of the honeycomb molding 1 was poor. When the temperature of the first sintering was different from that of the second sintering by at least 150° C., the thin honeycomb shaped ceramic 43 with the intended shape was obtained.

Figure 10:
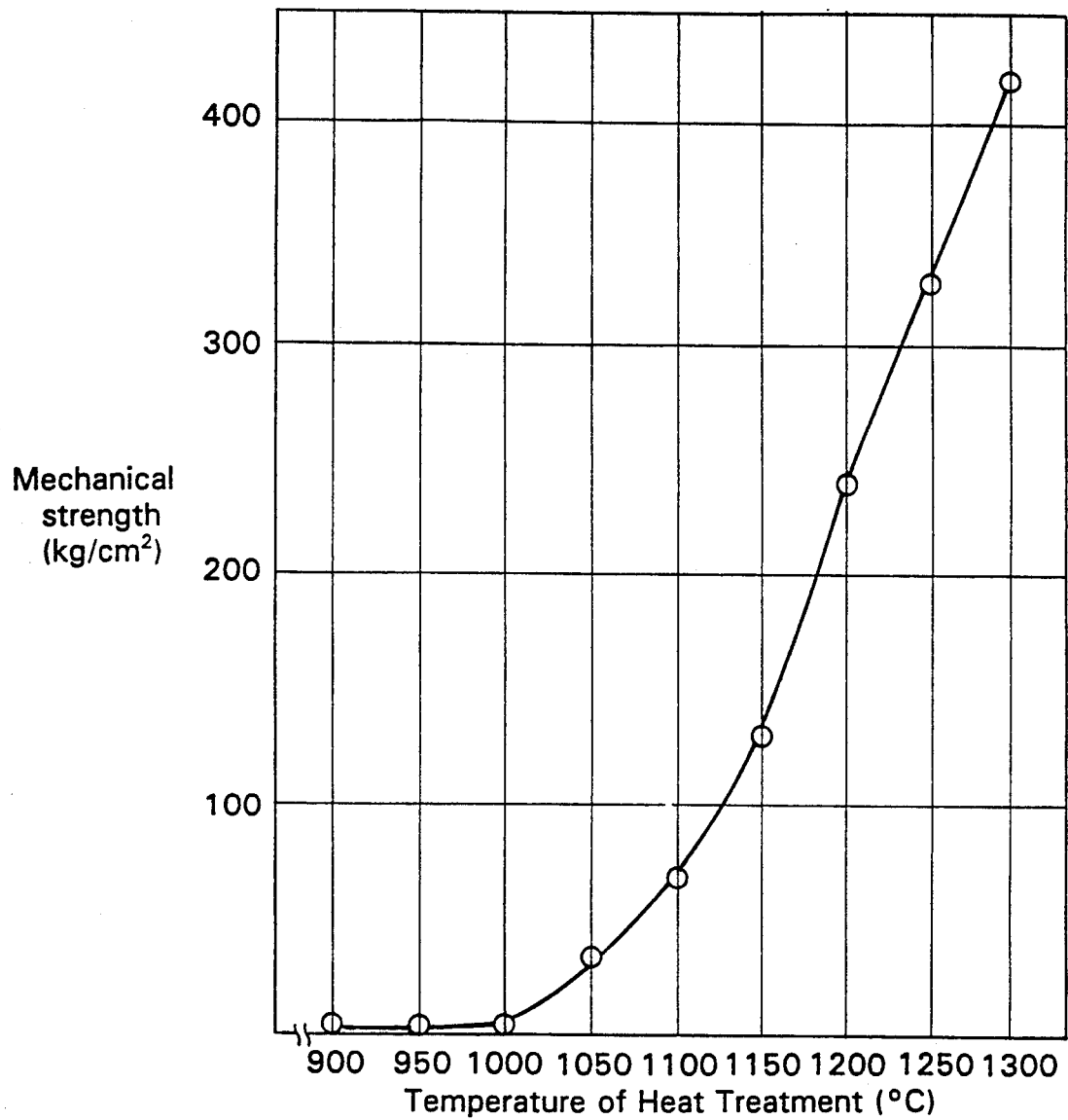
FIG. 10 is a graph showing the relationship between the temperature of heat treatment and the mechanical strength of a ceramic from the production step of FIG. 9.

In order to find reasons for the above, the relationship between the heat treatment temperature and the mechanical strength of the honeycomb shaped ceramic obtained by sintering the honeycomb molding containing the same composition as that of Example 18 was examined. The results are shown in Table 12 and FIG. 10. The mechanical strength is shown as compressive strength in the direction of the honeycomb lattice of the honeycomb shaped ceramic with a dimension of 10 mm × 10 mm × 10 mm.

TABLE 12

| Heat treatment temperature (°C.) | Mechanical strength (kg/cm$^2$) |
|---|---|
| 900 | 6 |
| 950 | 6 |
| 1,000 | 7 |
| 1,050 | 35 |
| 1,100 | 70 |
| 1,150 | 130 |
| 1,200 | 240 |
| 1,250 | 330 |
| 1,300 | 420 |

As shown in Table 12, the honeycomb shaped ceramic in this example is rapidly sintered at the temperature above 1,100° C., indicating that the honeycomb molding begins to sinter and does not have a great degree of mechanical strength yet in the range of temperatures of the first sintering of the present invention.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

We claim:

1. A method for producing a honeycomb shaped ceramic having a predetermined shape made of a honeycomb molding formed from a composition containing a heat-resistant inorganic material, comprising the steps of:

forming a honeycomb molding from a composition containing heat-resistant inorganic material and a binder which is gelled when coming in contact with hot water;

immersing the honeycomb molding in hot water at a temperature high enough to gel the binder to mechanically strengthen the honeycomb molding;

drying the honeycomb molding using a dielectric unit; and sintering the honeycomb molding.

2. A method for producing a honeycomb shaped ceramic according to claim 1, wherein the hot water contains a surfactant.

3. A method for producing a honeycomb shaped ceramic according to claim 1, wherein the hot water contains an additive for maintaining the shape of the honeycomb molding.

4. A method for producing a honeycomb shaped ceramic according to claim 3, wherein the additive is tannic acid.

5. A method for producing a honeycomb shaped ceramic according to claim 1, wherein the binder is selected from the group consisting of methyl cellulose, hydroxypropyl cellulose, and hydroxypropylmethyl cellulose.

6. A method for producing a honeycomb shaped ceramic according to claim 1, wherein flexibility is provided by incorporating a plasticizer in the composition.

7. A method for producing a honeycomb shaped ceramic according to claim 1, wherein the honeycomb shaped ceramic is formed from a composition of 80 to 90% by weight of $SiO_2$, 5 to 18% by weight of $Al_2O_3$, 2 to 6% by weight of $TiO_2$, and 0.4 to 1.5% by weight of $K_2O$.

8. A method for producing a honeycomb shaped ceramic having a predetermined shape made of a honeycomb molding formed from a composition containing a heat-resistant inorganic material, comprising the steps of:

forming a honeycomb molding from a composition containing heat-resistant inorganic materials and a binder which is gelled when coming in contact with hot water;

immersing the honeycomb molding in hot water at a temperature high enough to gel the binder to mechanically strengthen the honeycomb molding, the hot water containing tannic acid for maintaining the shape of the honeycomb molding; and sintering the honeycomb molding.

* * * * *